March 9, 1937.    J. A. MARTIN    2,072,898
ROD JOINT OR COUPLING
Filed Nov. 17, 1934    3 Sheets-Sheet 1
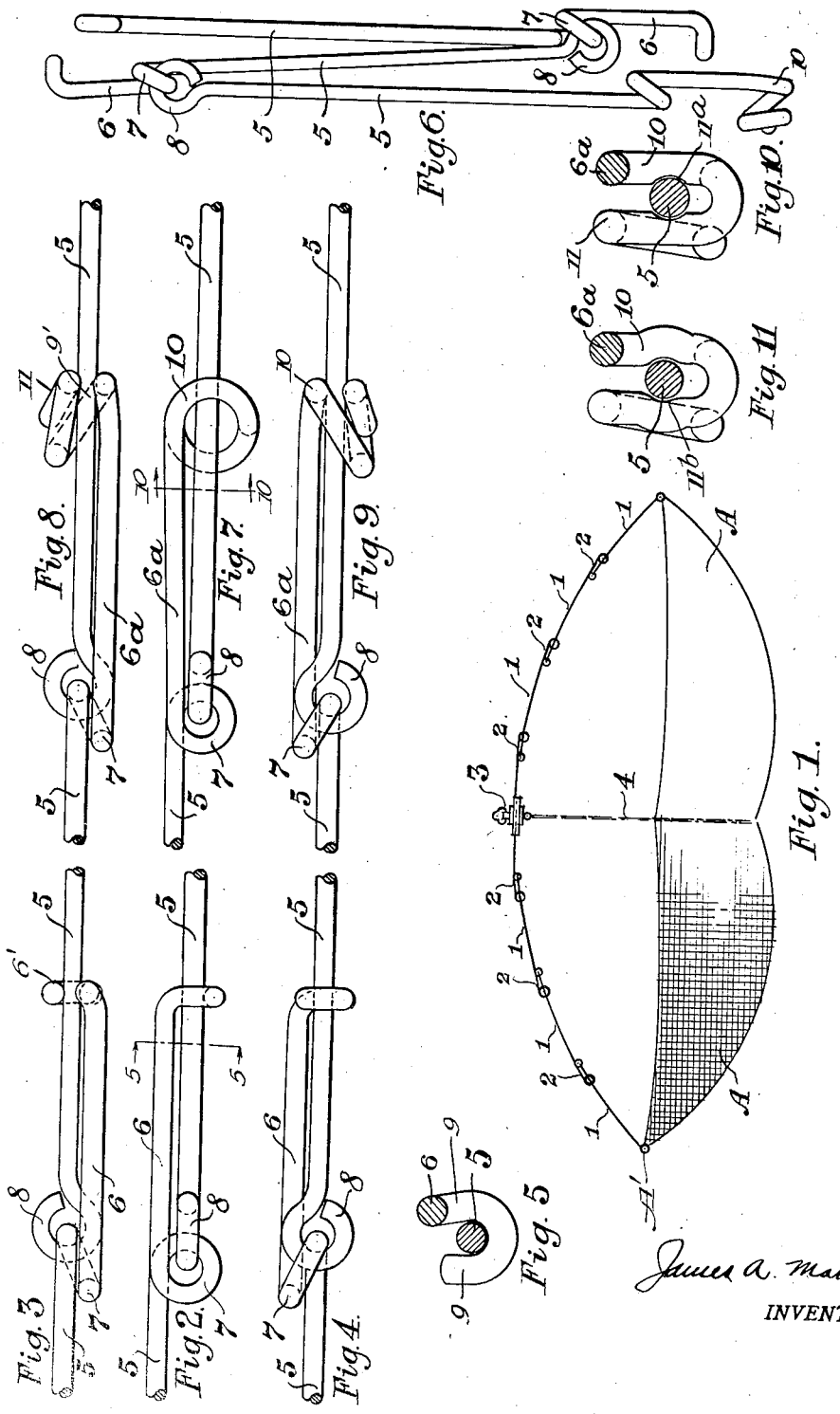

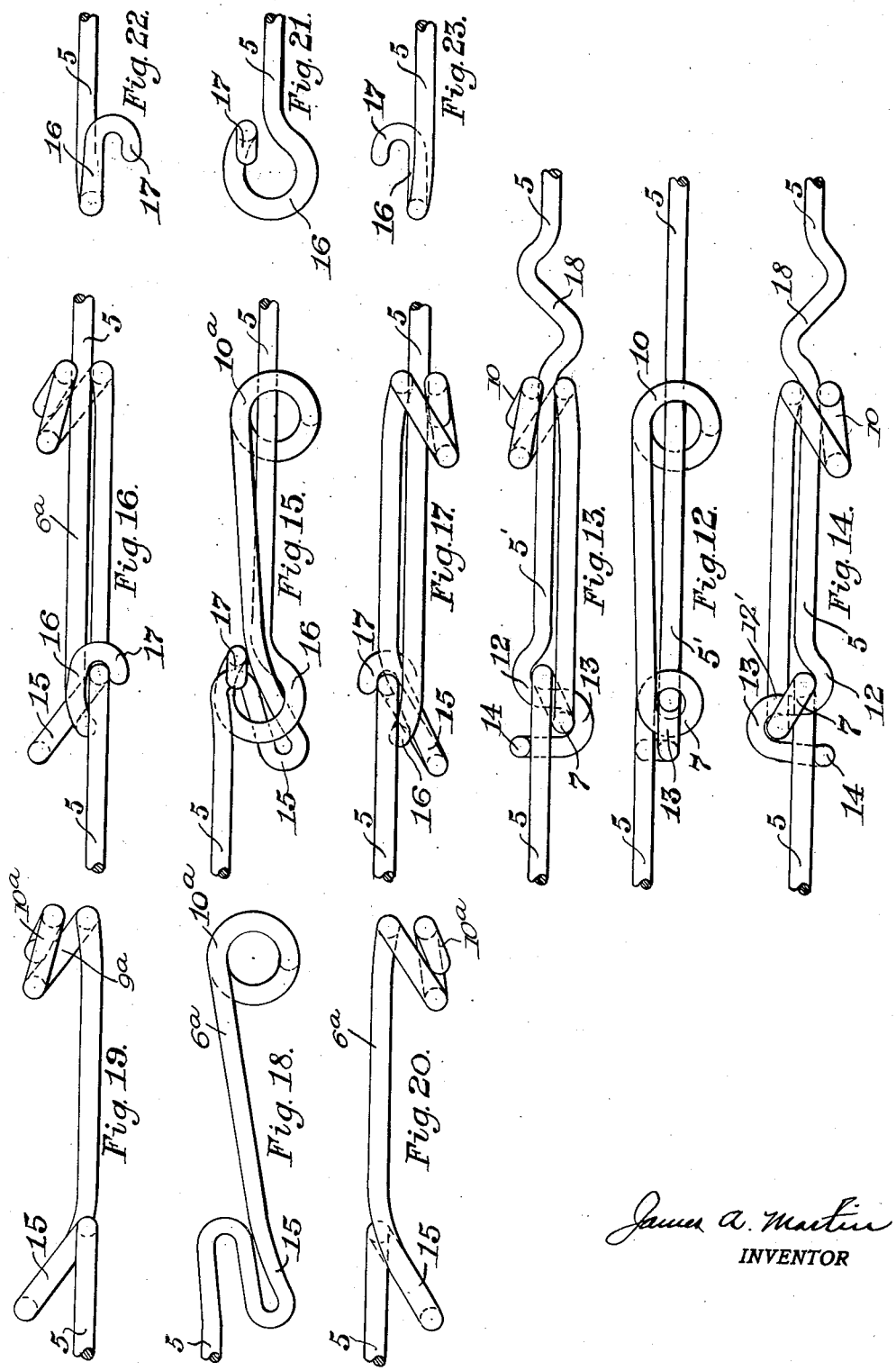

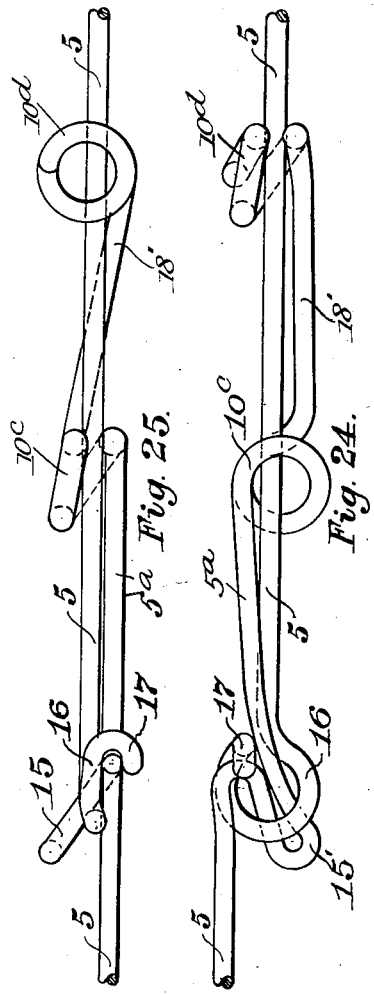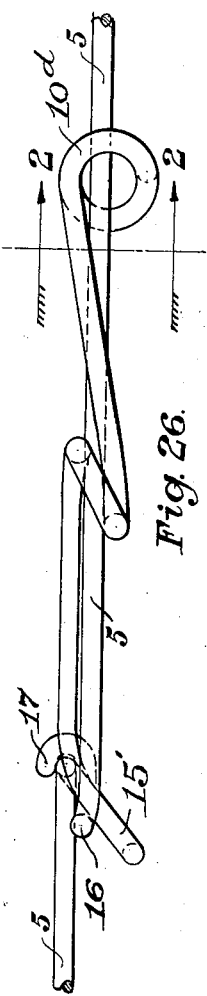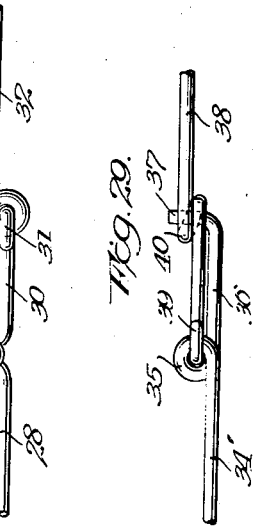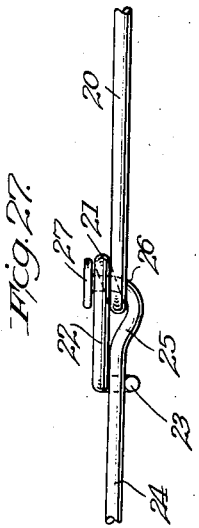

Patented Mar. 9, 1937

2,072,898

UNITED STATES PATENT OFFICE 2,072,898

ROD JOINT OR COUPLING

James A. Martin, Roanoke, Va.

Application November 17, 1934, Serial No. 753,486

12 Claims. (Cl. 287—103)

The present invention relates to an improved rod joint or coupling, and more particularly to means for positively and securely connecting rod members, links or other sectional parts in substantially longitudinal alignment. The application is a continuation in part of my copending application, Serial No. 678,658, filed July 1, 1933.

An essential feature of the invention consists in the provision of a joint construction having means whereby the adjacent rod members or sections may be firmly secured or connected in longitudinal alignment so that the extended members will have the same rigidity and efficiency in operation as a solid or one-piece structure, and in which the rod members when not in use may be readily collapsed or disconnected and folded into a compact form.

A further object comprehends the provision of a simple, durable, efficient, and economical joint or coupling for rod members, which comprises a minimum number of parts and which can be set up or dismantled without the use of tools of any kind. Additionally, the joint is so constructed as to be capable of withstanding the exacting demands to which devices of this type are usually subjected.

Other objects and advantages of the invention will become apparent from the following description when taken in conjunction with the accompanying claims and drawings.

Referring to the drawings in which are shown several embodiments the invention may assume:

Figure 1 is a side view of a collapsible fishing net having my invention associated therewith.

Figure 2 is an enlarged side elevation of adjacent rod members connected by my improved joint.

Figure 3 is a plan view of Figure 2.

Figure 4 is a bottom view of Figure 2.

Figure 5 is a sectional view taken substantially along the line 5—5 of Figure 2.

Figure 6 shows the rod members in a collapsed or folded position.

Figure 7 is a side elevation of a modified form of the invention.

Figure 8 is a plan view of Figure 7.

Figure 9 is a bottom view of Figure 7.

Figure 10 is a sectional view taken along the line 10—10 of Figure 7.

Figure 11 is a view similar to Figure 10 showing a modification thereof.

Figures 12, 13 and 14 are side, plan, and bottom views, respectively, of a further modification.

Figures 15, 16 and 17 are side, plan, and bottom views of another modification.

Figures 18, 19, 20, 21, 22 and 23 are separate detailed views of the modification shown in Figure 15.

Figures 24, 25 and 26 are side, plan, and bottom views of a further modification.

Figure 27 shows a further modification.

Figure 28 illustrates another modification, and

Figure 29 shows another form which the invention may assume.

As illustrating one of the many uses to which my rod joint or coupling may be applied, there is shown in Figure 1 a collapsible fishing net A arranged in its opened position to be supported by the substantially umbrella-shaped frame which is composed of links or sectional members 1 having interconnecting joints 2 formed in accordance with the present invention. The lower end of the frame is connected to the net as at A' and is centrally secured to a clamping device 3. The net A may be medially supported by a flexible member or cord 4 which is connected at its upper end to the clamp 3.

The links 1 are sufficiently yieldable to permit the frame to assume a bow-shape while the joint 2 allows the frame to be collapsed so as to assume a compact form when the net is in its inoperative position.

As shown in Figures 2, 3, 4, and 5, my improved rod joint or coupling may comprise a series of metallic rod members or links 5 of the same or different lengths and of sufficient tensile strength and size as the particular use to which they are to be applied requires. Each of the rod members 5 is formed with an intermediate loop or eyelet 7 bent so as to extend from either side of the member 5 and constitutes a retaining means for receiving a complementary formed loop or eyelet 8 on the end of the adjacent or succeeding member 5. The loop 7 has extending therefrom a longitudinal portion 6 which is disposed substantially parallel to the member 5 and terminates in a laterally disposed curved or hooked support 6', the opposed arms 9 of which are suitably spaced apart so as to yieldably receive a longitudinal portion of the adjacent member 5 when the joint is set up to maintain the latter in substantial alignment with its adjacent link member.

When setting up the joint, the loop 8 which is pivotally connected to the loop 7, is moved to allow the member 5 to which the loop 8 is connected to be pressed into frictional engagement with the arms 9 of the support 6. Conversely, when it is desired to collapse or fold the links into a compact form the longitudinal portions of the member 5 engaged by the arms 9 will be released therefrom upon the application of slight manual pressure, thus allowing the loop 8 to swing about its pivot to any desired position. The arms 9, it will be observed, converge upwardly so as to frictionally receive the longitudinal portion of the succeeding member 5 when the joint is set up.

In the form of the invention illustrated in Figures 7, 8 and 9, the loop 7 and eyelet 8 of each of the members 5 are the same in construction as the form previously described. However, the longitudinal arm 6a which extends from the loop 7 has a laterally disposed support 10 formed by providing the end of the arm 6a with double convolutions or loops 11 which extend from the same side of the arm as the loop 7. The adjacent convolutions are sufficiently spaced apart as at 9' to frictionally receive the horizontal portion of the adjacent member 5 when the joint is set up. The loops 11 between the space 9' constitute converging yieldingly disposed means for detachably engaging the adjacent member 5, and as shown in Figure 10 may be formed with notches 11a to receive member 5 with a "snap action" to secure the latter in alignment with the adjacent member 5. As shown in Figure 11, the notches 11b are formed by bodily distorting the loops.

In the modified form shown in Figures 12, 13 and 14 the intermediate loop 7 and the support 10 are substantially similar in construction to the form shown in Figure 7. The opposite end of each of the members 5, however, instead of being connected to the loop 7 by an eyelet, is preferably bent or curved laterally as at 12 to form a transversely disposed arm 12', which is arranged to extend through the loop 7. The arm 12' is reversely curved as at 13 and is then bent laterally to form a hooked or curved support 14 which engages the adjacent member 5 when the coupling is set up. The arm 12' and its associated parts constitute detachable means for connecting the adjacent links together. The longitudinal portion of the member 5 is received between the spaced loops 10 so as to be frictionally held thereby and may be formed with the staggered or off-set portions 18 which facilitates the use of the rod members when the same is employed for laying underground cable and the like. This form of the invention essentially distinguishes from the forms previously described, in that the adjacent portions of the members 5 are not permanently connected, but are arranged to be withdrawn from each other when the coupling is broken. It will be seen that the engagement of the curved or hooked portion 14 with the adjacent member 5 serves to maintain the arm 12' and its associated parts firmly in position when the members 5 are extended.

In the form of the invention disclosed in Figures 15, 16 and 17, the intermediate portion of the member 5, is provided with a double elongated loop 15 (Figure 18) which forms an inclined projection or lug that may extend from either side of the member 5. The projection 15 terminates in a longitudinally disposed portion 6a which has at its end a double loop or support 10a extending from the same side of the member 6a as the projection 15. The space 9a (Fig. 19) between the adjacent loops of the support 10a is such as to frictionally receive the adjacent longitudinal portion 5 of the succeeding member. The opposite end of the member 5 (Figure 21) is formed with an open loop 16 that terminates in an outwardly bent or hooked arm 17. When the coupling is set up, the loop 16 is connected to the projection 15 on the adjacent member, (Figure 16) while the space between the arm 17 and the loop 16 is received by the adjacent portion of the projection 15. The support 10a receives the longitudinal portion of the adjacent member 5 so as to provide a firm and positive means for connecting the rod members or sections together and at the same time permit the joint to be easily broken and the parts disconnected.

In the modification shown in Figures 24, 25 and 26, the member 5 is provided with a projection 15' which has a longitudinal portion 5a formed into a loop 10c. Projecting from the loop 10c is a longitudinal portion 18' which terminates in a double loop 10d. The opposite end of the member 5 is formed with a loop 16 and arm 17 similar to that shown in Figure 21. The projection 15' releasably receives the loop 16, while the longitudinal portion of the member 5 is held between the loops 10c and 10d in the manner as shown in Figure 24. The intermediate loop 10c constitutes additional supporting means for maintaining the adjacent portion of the member 5 in position when the coupling is set up.

In the modification shown in Figure 27, the rod member 20 is formed with a loop 21 that has extending therefrom a longitudinal portion 22 which terminates in a laterally disposed curved arm or hook 23 that aligns with the rod 20. The coacting rod member 24 has its adjacent end 25 bent to form a lateral arm 26 which terminates in an enlarged head 27. In assembling the coupling, the horizontal portion of the member 24 is first passed through the loop 21 and then turned so as to permit the lateral arm 26 to fit therein. Further movement of the arm is limited by the head 27. The arm 26 constitutes a pivotal support which permits the rod 24 to be moved so as to engage the curved hook and align with the complementary member 20. The engagement of the hook 23 with the member 24 tends to maintain the rod members in longitudinal alignment. The free ends of the rods 20 and 24 may be of any suitable shape so as to connect them to the parts with which the coupling is to be associated. When it is desired to disengage the rod 24 from the rod 20, the longitudinal portion of the member 24 is withdrawn from engagement with the hook 23 and moved to a position so as to pass through the loop 21 in a direction opposite to that in which it was initially introduced.

In the form of the invention shown in Figure 28, a rod member 28 has an intermediate laterally disposed support 29 formed from the rod member in the manner as shown. Extending from the support 29 is an arm 30 which terminates in a loop 31. The adjacent rod member 32 has an intermediate loop 33 which is permanently connected to the loop 31 and has extending therefrom an arm 34 of sufficient length to engage the support 29 and be maintained thereby in a fixed position.

In the modified form of the invention shown in Figure 29, the rod member 34' has an intermediate loop 35 which extends forwardly to form a horizontal portion 36 that terminates in a laterally projecting lug 37. The adjacent or succeeding rod member 38 has a loop 39 at one end which is connected to the loop 35 and is provided with an intermediate loop 40 that receives the projection 37 when the coupling is set up. The opposite ends of the rod members 34' and 38 may be of any suitable configuration depending upon the use to which the coupling is to be applied.

It will be seen that a coupling made in accordance with the present invention can be quickly set up and will insure the parts being firmly and securely held in their interconnected positions and may be readily dismantled or disconnected so as to assume a compact form. Moreover, while I have, for the purpose of illustration, shown each link member of the same configuration, it will be manifest that the coupling is equally applicable for use where it is desired to secure two members of different construction. In such cases the joint structure may be of any of the forms illustrated, while the remaining portions of the members 5 may assume any shape or configuration as desired.

It will be observed that a characteristic feature of the invention consists in providing the adjacent or succeeding rod members with retaining means and spaced fixed supporting or locking means which are integrally formed from the members and which when the coupling is set up co-act to provide a firm and positive joint connection without the aid of additional means for connecting or disconnecting the coupling. Moreover, the joint is of such a character that the rod members may be either permanently or detachably connected to one another as the use to which the coupling is applied may require.

It is to be understood that the forms of the invention herein shown and described are merely illustrative and that such changes may be made as fall within the purview of one skilled in the art without departing from the scope of the appended claims.

I claim:

1. In a rod joint or coupling, a first rod member having at a point near one end thereof a loop or eye, said loop or eye engaging and retaining the loop or eye of a second rod member, the first mentioned rod member continuing beyond the loop or eye parallel to said second rod when the rods are in alignment, and terminating in a resilient loop adapted to have snap engagement with said second rod member for retaining said rods in alignment.

2. A rod joint or coupling of the class described including sectional members arranged to be firmly connected in substantial alignment with one another, each member having retaining means at one end and a yieldable support at its opposite end, and the intermediate portion of each member having means for receiving the retaining means on the adjacent member, said yieldable support arranged to receive an intermediate portion of the adjacent member when the joint is set up.

3. A rod joint or coupling of the class described, including sectional members arranged to be firmly connected in substantial alignment with one another, each member having a loop at one end and a yieldable support at its opposite end, and the intermediate portion of said member having a loop arranged to receive the loop in the end of the adjacent member, said yieldable support arranged to engage the intermediate portion of the adjacent member when the joint is set up.

4. In a rod joint or coupling, rod members having loops or eyes linked with each other, one of the rod members continuing beyond the loop therein in a direction substantially parallel to the adjacent rod member and terminating in an open hooked end, said end engaging and retaining said adjacent rod member.

5. A rod joint or coupling of the class described including detachable members arranged to be firmly connected in substantial alignment with one another, each member having an opened eye at one end terminating in a laterally disposed hook, the opposite end of the member having a supporting loop, said member intermediate its ends having a laterally inclined projection whereby when the joint is set up, the projection on one member engages the open eye and hook of the adjacent member and the supporting loop receives an intermediate portion of the adjacent member whereby to firmly maintain the joint in a fixed position.

6. A rod joint or coupling of the class described including detachable members arranged to be firmly connected in substantial alignment with one another, each member having a loop at one end and yieldable supporting means at its opposite end, and the intermediate portion of said member having a laterally inclined projection whereby when the joint is set up, said projection detachably receives the loop in the adjacent member and the supporting means yieldably maintains an intermediate portion of the adjacent member in a fixed position.

7. A rod joint or coupling of the class described including detachable members arranged to be firmly connected in substantial alignment with one another, each member having a loop intermediate the ends thereof and a supporting loop at one end, the opposed end of the succeeding member having a laterally offset bent portion provided with a reversely disposed arm terminating in a curved end, whereby when the joint is set up, the curved end of the succeeding member is passed through the intermediate loop portion and engages the adjacent member and the supporting loop receives the intermediate portion of the succeeding member to maintain the members in a fixed position.

8. A rod joint or coupling for sectional members adapted to be arranged in substantially longitudinal alignment, said members having interengaging connecting means including a loop portion and a spaced locking means integrally formed on one of the members, and the other adjacent or succeeding member having a looped end connected to said loop portion and a longitudinal portion releasably engaging the locking means to maintain the members in alignment when the joint is set up and permit the members to be folded into a compact position when the joint is disconnected.

9. A rod joint or coupling for sectional members adapted to be arranged in substantial longitudinal alignment, said members having interengaging connecting means including an offset projection and spaced locking means integrally formed on one of the members, and the other adjacent or succeeding member having means detachably connected to said projection and a longitudinal portion releasably engaging the locking means to maintain the members in alignment when the joint is set up and permit the members to be detached when the joint is disconnected.

10. A rod joint or coupling for sectional members adapted to be arranged in substantial longitudinal alignment, one of said members constituting the first member and the other the second member, said members having interengaging connecting means including an integral intermediate retaining means on the first member for receiving the adjacent overlapped portion of the second member, said first member having a portion extending beyond the retaining means and provided with an integral locking means arranged releasably to receive an adjacent portion of the second member to maintain the members in a fixed position when the joint is set up.

11. A rod joint or coupling for sectional members adapted to be arranged in substantially longitudinal alignment, said members having interengaging connecting means, and one of said members being bent adjacent the connecting means to form a laterally off-set portion provided with spaced clamping means disposed substantially in longitudinal alignment with the connecting means and adapted releasably to engage the opposite sides of the other of said members to maintain the members in longitudinal alignment when the joint is set up.

12. A two-piece rod joint or coupling for sectional members adapted to be arranged in substantially longitudinal alignment, said members having interengaging connecting means, and one of said members being bent to form an off-set longitudinally disposed portion provided with spaced yieldable clamping arms disposed substantially in alignment with the connecting means and adapted to releasably engage the other of said members to maintain the members in longitudinal alignment when the joint is set up.

JAMES A. MARTIN.